(12) United States Patent
Redaelli et al.

(10) Patent No.: US 9,564,068 B2
(45) Date of Patent: Feb. 7, 2017

(54) DEVICE FOR SURGICAL TRAINING

(71) Applicant: POLITECNICO DI MILANO, Milan (IT)

(72) Inventors: Alberto Cesare Luigi Redaelli, Milan (IT); Gianfranco Beniamino Fiore, Milan (IT); Chiara Cipollini, Cerro Al Lambro (IT); Simone Ghilardi, Sorisole (IT); Riccardo Vismara, Seregno (IT); Danilo De Lorenzo, Brescia (IT); Giorgio Bozzini, Opera (IT)

(73) Assignee: POLITECNICO DI MILANO, Milan (IT)

( * ) Notice: Subject to any disclaimer, the term of this patent is extended or adjusted under 35 U.S.C. 154(b) by 221 days.

(21) Appl. No.: 14/380,437

(22) PCT Filed: Feb. 22, 2013

(86) PCT No.: PCT/IB2013/000250
§ 371 (c)(1),
(2) Date: Aug. 22, 2014

(87) PCT Pub. No.: WO2013/124725
PCT Pub. Date: Aug. 29, 2013

(65) Prior Publication Data
US 2015/0037776 A1 Feb. 5, 2015

(30) Foreign Application Priority Data
Feb. 24, 2012 (IT) .............................. BG2012A0010

(51) Int. Cl.
*G09B 23/28* (2006.01)
*G09B 23/30* (2006.01)

(52) U.S. Cl.
CPC ............... *G09B 23/30* (2013.01); *G09B 23/28* (2013.01)

(58) Field of Classification Search
USPC .................. 434/262, 267, 269, 270, 272
See application file for complete search history.

(56) References Cited

U.S. PATENT DOCUMENTS 5,055,051 A 10/1991 Duncan
5,850,033 A * 12/1998 Mirzeabasov ......... G09B 23/28
434/267

(Continued)

FOREIGN PATENT DOCUMENTS

JP 2009071393 A 4/2009
WO 0036577 A1 6/2000

(Continued)

*Primary Examiner* — Kurt Fernstrom
(74) *Attorney, Agent, or Firm* — King & Schickli, PLLC

(57) ABSTRACT

A device for surgical training comprising: an external first layer (11, 45) which simulates the subcutaneous fat; a second layer (12, 44) internal to said first layer (11, 45), which simulates the muscle; a fourth layer (16, 17, 42), internal to said second layer (12, 44), which simulates the perirenal fat; a kidney (14, 15, 41), internal to said fourth layer (16, 17, 42); said first, second and fourth layer having a sound propagation velocity between 1500 and 1550 m/s, an acoustic impedance between 1.5 and 1.7 $10^6$ Kg/sm², an elastic modulus between 0.4 and 4.2 kPa, and being able to be perforated manually by surgical instruments.

10 Claims, 3 Drawing Sheets

(56) References Cited

U.S. PATENT DOCUMENTS

| | | | | |
|---|---|---|---|---|
| 7,931,471 B2* | 4/2011 | Senagore | ............. | G09B 23/285 |
| | | | | 434/267 |
| 8,297,982 B2* | 10/2012 | Park | ....................... | G09B 23/34 |
| | | | | 434/262 |
| 8,403,675 B2* | 3/2013 | Stoianovici | ............ | G09B 23/28 |
| | | | | 434/262 |
| 8,480,407 B2* | 7/2013 | Campbell | .............. | G09B 23/28 |
| | | | | 434/272 |
| 8,556,635 B2* | 10/2013 | Toly | ..................... | G09B 23/285 |
| | | | | 434/262 |
| 8,808,004 B2* | 8/2014 | Misawa | ............... | G09B 23/285 |
| | | | | 434/268 |
| 2008/0076101 A1* | 3/2008 | Hyde | ................. | G09B 23/30 |
| | | | | 434/272 |
| 2009/0226866 A1* | 9/2009 | Durbin | ................. | G09B 23/285 |
| | | | | 434/267 |
| 2009/0298034 A1 | 12/2009 | Parry et al. | | |
| 2010/0279263 A1 | 11/2010 | Duryea | | |
| 2012/0045743 A1* | 2/2012 | Okano | ................... | G09B 23/30 |
| | | | | 434/272 |
| 2014/0087344 A1* | 3/2014 | Mavroudis | ........... | G09B 23/306 |
| | | | | 434/272 |

FOREIGN PATENT DOCUMENTS

| | | |
|---|---|---|
| WO | 0238039 A2 | 5/2002 |
| WO | 2011111572 A1 | 9/2011 |

* cited by examiner

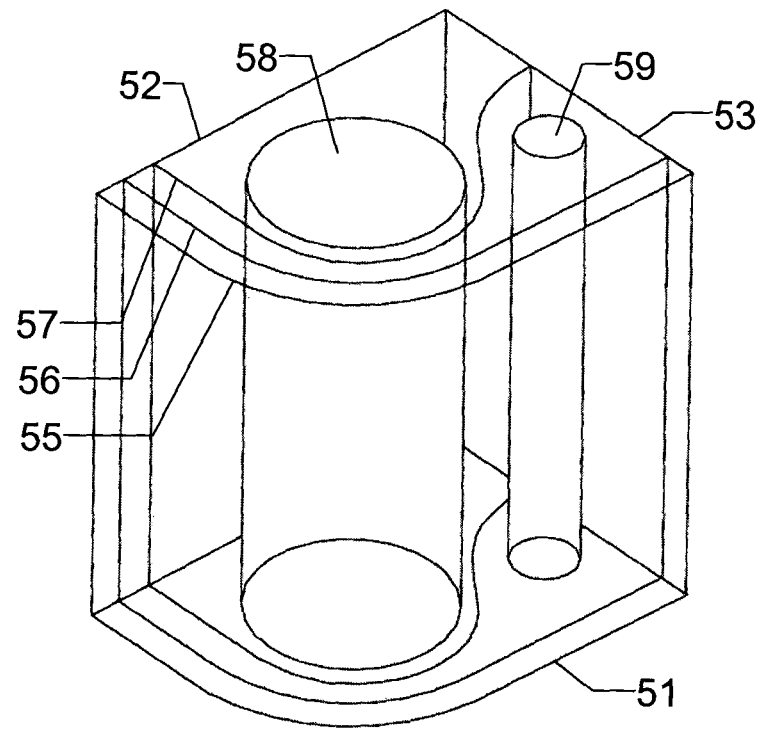
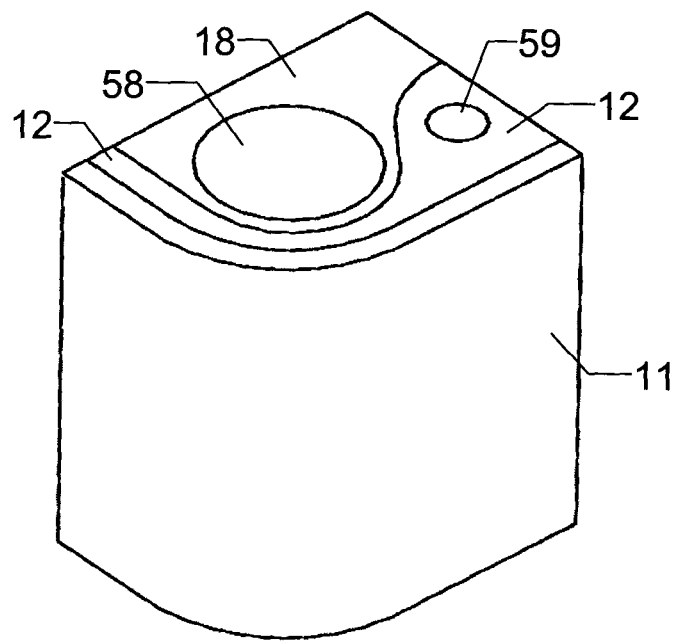

DEVICE FOR SURGICAL TRAINING

This application is the national stage of PCT/IB2013/000250, filed Feb. 22, 2013, which claims priority from Italian Application No. BG2012A000010, filed Feb. 24, 2012.

FIELD OF THE INVENTION

The present invention relates to a device for surgical training. In particular, it relates to a device for the surgical training of lithotripsy (an operation involving kidney stone crushing within the urinary tracts).

BACKGROUND OF THE INVENTION

Percutaneous nephrolithotripsy (PCNL) is currently the main option in the treatment of large dimension kidney stones.

SUMMARY OF THE INVENTION

This surgical technique comprises the creation of a double operating field: namely one by the ureter for retrograde manoeuvres, and one by the flank for anterograde manoeuvres. To obtain percutaneous anterograde access to the kidney (nephrostomy), an echographic support is used to guide the operator in inserting a needle which generates the access path to the stone. After obtaining secure access to the kidney, the nephroscope is inserted to obtain a direct view. At this point destruction takes place (by ultrasound, pneumatic, electrohydraulic or laser probes) followed by removal of the aggregate.

The greatest risks associated with the entire procedure are related to the nephrostomy, and range from bleeding of the parenthyma (with the consequent need to postpone the procedure) to damage of neighbouring organs.

Consequently an adequate period of operator training in performing the echoguided renal injection is essential.

A strategy normally followed for training clinical personnel consists of using mannequins which enable the sequence of the procedure to be reproduced in a manner similar to reality (in terms for example of retrieval points, guide systems, haptic feedback, etc.).

Certain mannequins used for this purpose are known, such as the document U.S. Pat. No. 5,055,051 which describes a body reproducing the anatomical form of the kidney provided in the interior of a matrix which reproduces the acoustic properties of the liver. The volume is connected to the outside via suitable channels through which it is filled with gel for ultrasound and materials which reproduce the kidney stones. The procedure is simulated via the provided channels, and the fragmented stone is removed.

An object of the present invention is to provide a device for surgical training, in particular for lithotripsy, which reproduces as far as possible the physical characteristics of the human tissues.

Another object is to provide a device which is of simple implementation.

A further object is to provide a device which can be reused several times.

These and other objects are attained according to the present invention by a device for surgical training comprising: an external first layer (11, 45) which simulates the subcutaneous fat; a second layer (12, 44) internal to said first layer (11, 45), which simulates the muscle; a fourth layer (16, 17, 42), internal to said second layer (12, 44), which simulates the perirenal fat; a kidney (14, 15, 41), internal to said fourth layer (16, 17, 42); said first, second and fourth layer having a sound propagation velocity between 1500 and 1550 m/s, an acoustic impedance between 1.5 and 1.7 $10^6$ $Kg/sm^2$, an elastic modulus between 0.4 and 4.2 kPa, and being able to be perforated manually by surgical instruments.

Further characteristics of the invention are described in the dependent claims.

This solution has various advantages compared with solutions of the known art.

Firstly, the device or mannequin enables access to the kidney from different angulations and entry points, so accentuating the device potentiality in terms of approach, typical of surgical training procedures.

Secondly, the device can be reused for simulating several procedures (of the order of tens of times).

Thirdly, similar to that which happens in the operating theatre, a previously implemented procedure leaves only a minimal surface tract and an internal echographic trace.

Fourthly, the choice of materials enables the mannequin to be easily constructed.

Fifthly, the mannequin can accommodate different cartridges at successive times. For this reason the cartridges containing the kidneys are produced in suitable separate moulds. In this respect, the cartridges are reused to a lesser extent than the mannequin itself. Hence in this manner, training can be implemented in succession on different pathological models. A system for preserving the renal cartridges could be conceived which uses kidneys fixed in formalin, or fresh kidneys preserved by a cold chain, or by suitable preservation agents and subsequent packaging of the cartridge.

BRIEF DESCRIPTION OF THE DRAWING FIGURES

The characteristics and advantages of the present invention will be apparent from the following detailed description of one embodiment thereof, illustrated by way of non-limiting example in the accompanying drawings, in which:

FIG. 5 is a perspective and partially perspective view of a mould for forming a surgical training device in accordance with a third embodiment of the present invention;

FIG. 6 is a perspective view of a surgical training device in accordance with a third embodiment of the present invention.

DETAILED DESCRIPTION OF THE INVENTION

Figure 1:
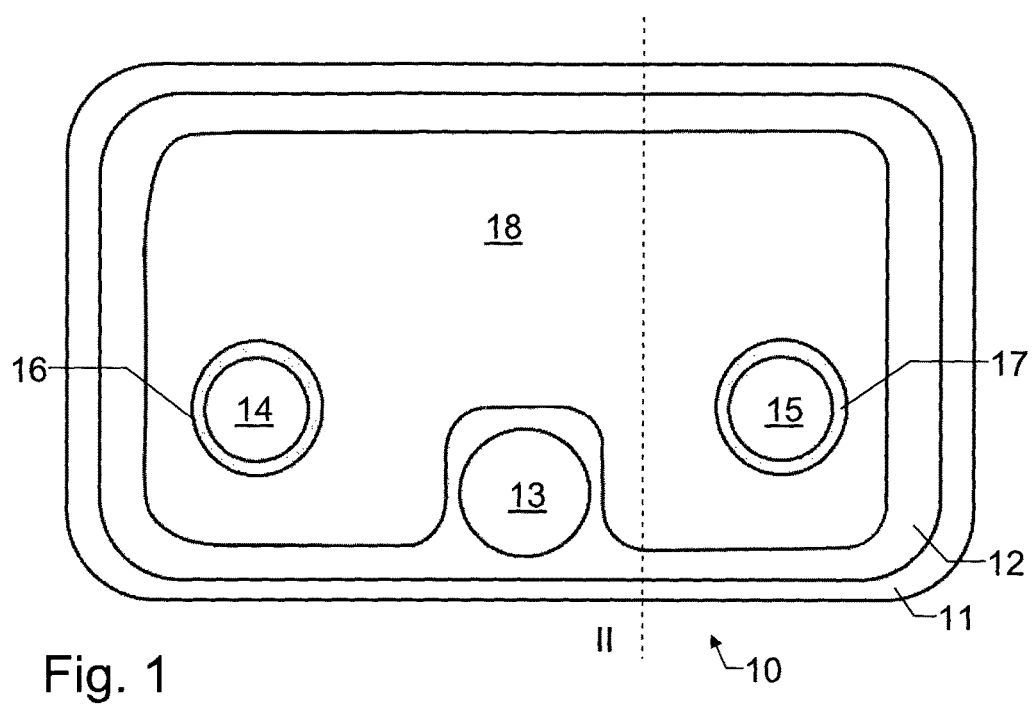
FIG. 1 shows a section through a surgical training device in accordance with a first embodiment of the present invention.

The external and internal structures of the device or mannequin 10 have morphological characteristics similar to the back portion concerned in the procedure. The portion of interest for the nephrostomy is that between the 11th and 12th rib and the iliac crests.

With reference to the accompanying figures, a device or mannequin 10 for surgical training of lithotripsy, in accordance with one embodiment of the present invention, is a body substantially of parallelepiped shape which represents that portion of the bust previously defined, such that two opposing sides of the parallelepiped hence correspond to two sections of the human bust. The mannequin 10 seeks to simulate the organs present in this body part and surrounding the kidneys.

The tissues to be reproduced within the mannequin can be reduced to a maximum of 5 (subcutaneous fat, muscular fascias, liver, perirenal fat and kidney), assuming that the viscera do not need to be reproduced as they are not involved in the actual procedure.

Alternatively, just three tissues, those concentrated within the part of greatest interest, could be reproduced, namely a single uniform layer representing the subcutaneous fat, muscle and liver; a layer for the perirenal fat; and the kidney.

When seen in section, it is substantially of rectangular shape and comprises a an external first material 11 surrounding the entire device and representing the skin and subcutaneous fat, and a second material 12, internal to the first, which surrounds the entire device and represents the muscle. It comprises, close to one side of the rectangle and central to it, a fifth material 13 of circular shape, representing the vertebral column. The second material 12 undergoes an enlargement in proximity to the fifth material 13 and surrounds it. Hence the fifth material 13 (vertebral column) is completely surrounded by the second material 12 (muscle).

Laterally to the fifth material 13, symmetrically on both sides but slightly more to the centre than the fifth material 13, there are a material kidney 14 and kidney 15. The kidneys 14 and 15 are surrounded respectively by a fourth material 16 and 17 which represent the perirenal fat, which together with the kidneys 14 and 15 have a vertical cylindrical shape.

Totally within the second material 12 (muscle) there is positioned a third material 18 which represents the liver and the other organs. This material 18 also surrounds the fourth material 16 and 17 (perirenal fat) which surround the kidneys 14 and 15.

A simplification can comprise a reduced portion of the mannequin 10 of FIG. 1. In particular a mannequin 20 can be formed by considering only the right hand part of the abdomen (FIG. 2), where the presence of the liver in the immediate vicinity of the kidney increases the criticality of the operation and the consequent need for training.

In this case the structure is identical to that of FIG. 1, but reduced to only that portion comprising the portion to the left of the axis II of FIG. 1.

The procedure is implemented in most cases with the patient in the prone position. Hence consideration could be given to further reducing the portion to be reproduced, to just the latero-rear portion of the zone of interest, as represented in FIG. 3.

Figure 2:
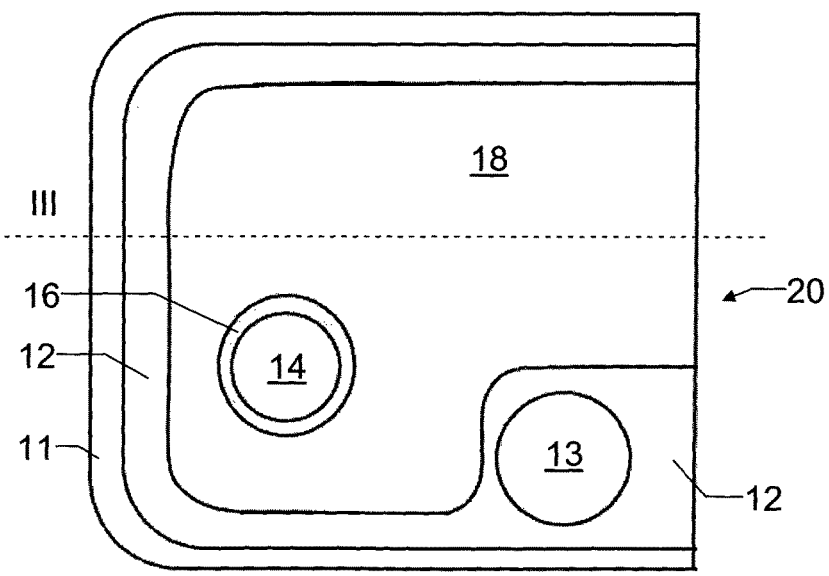
FIG. 2 shows a section through a surgical training device in accordance with a second embodiment of the present invention.

In this case the resultant mannequin 30 has a structure identical to that of FIG. 2 but reduced to just that portion comprising the portion below the axis III of FIG. 2.

Figure 3:
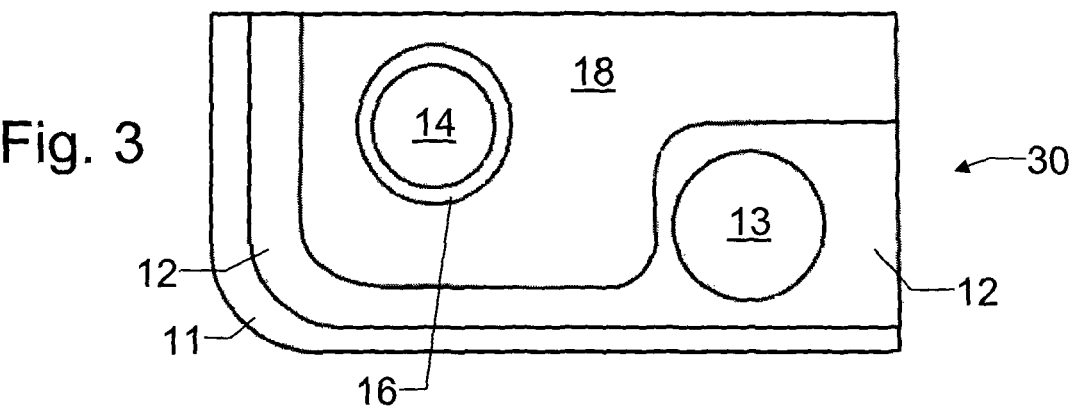
FIG. 3 shows a section through a surgical training device in accordance with a third embodiment of the present invention.
Figure 4:
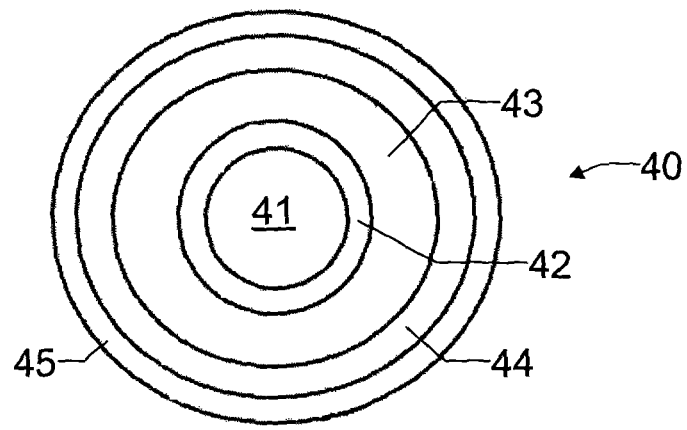
FIG. 4 shows a section through a surgical training device in accordance with a fourth embodiment of the present invention.

In an embodiment of the mannequin 30 such as that of FIG. 3, it has a rectangular shape of which the width is of 200 mm, the height is of 150 mm, the diameter of the circular fifth material 13 (vertebral column) is of 40 mm, the diameter of the circular kidney 14 is of 90 mm, and the thickness of the layers 11 (skin) and 12 (muscle) is of 15 mm.

Finally the shape of the mannequin can be simplified by abstracting the structure until it is made to assume an axial symmetry, possibly dispensing with certain landmarks such as the vertebral column. This configuration, to the loss of some anatomical and echogenic adherence, presents however the advantage of enabling access from several directions (theoretically along an angle of 360°.

In this case the result is a mannequin 40 having a concentric ring structure. Starting from the interior there is an internal material 41 which represents the kidney; a material 42 of circular ring shape surrounding the material 41, which represents the perirenal fat; a material 43 of circular ring shape surrounding the material 42, which represents the liver; a material 44 of circular ring shape surrounding the material 43, which represents the muscle; and finally a material 45 of circular ring shape surrounding the material 44, which represents the subcutaneous fat.

In an even more simplified embodiment, the material 42 representing the liver (and other internal organs) is eliminated, the resultant mannequin being then composed of only the subcutaneous fat 45, of the muscle 44, and of the perirenal fat 42 surrounding the kidney 41. The materials used for the mannequin must reproduce the physical characteristics of the tissues involved in the procedure (such as subcutaneous fat, muscle, abdominal organs, bone structures), in order to achieve adequate response to the mannequin echo. This specification enables the operator to identify, by means of the echo, realistic landmarks conforming to standard landmarks of the procedure, and to consequently guide the nephrostomy.

Table 1 shows some of the physical characteristics of the tissues which must be reproduced in the mannequin, where r represents the density, c the sound propagation velocity, Z the acoustic impedance and A the attenuation coefficient. The measurements were taken under normal working conditions for the use of the mannequin and hence at ambient temperature, for measuring the impedance Z the signal frequency being between those normally used by echographs, for example between 2 and 6 MHz.

The material used for reproducing the specific biological tissue must adequately reproduce the given characteristics.

Moreover, the materials must be able to be perforated by adequate surgical instruments. There must therefore not be preferential channels or prearranged channels for introducing the surgical instruments.

The choice of materials for constructing the mannequin is made after an experimental characterization of the acoustic properties of a range of materials considered suitable in terms of availability and workability.

The experimental apparatus used for measuring the acoustic properties of the materials is based on the pulse-echo method which uses a single probe acting both as emitter and as receiver. The ultrasonic probe is excited by a pulse generator (transmitter/receiver). The impressing wave generated by exciting the piezoelectric element is attenuated as it propagates through the material layers (walls of the test-piece of known dimensions and material to be tested) and is partially reflected by the discontinuities encountered along the path; the reflected components return to the transducer and are sensed with a certain delay relative to the instant of emission. On striking the probe, the reflected wave (echo) generates between its electrodes a potential difference which is retransmitted to the pulser/receiver, which by means of an oscilloscope displays the variation in the electrical signal sensed by the probe.

Following the results of the preliminary tests, a synthetic material such as polyvinyl alcohol (PVA) was used.

In particular, solutions of polyvinyl alcohol (PVA) were used, for example that known as Celvol® 165 of the Sekisui Chemical Co., and distilled water, with concentrations from 5 wt % to 12 wt % on the total weight according to the tissue to be reproduced, to model subcutaneous fat, muscle and liver; and food grade gelatin for the perirenal fat.

It was found preferable to use a PVA concentration of 5% for the subcutaneous fat, 12% for the muscle, and 8% for the liver.

Inserted into the mannequin there is a biological sample of a porcine kidney, fresh or fixed in formalin, incorporated in its turn into a structure (cartridge) of food grade gelatine. The cartridge can be withdrawn from the mannequin on termination of the training procedure and replaced by a new cartridge. Different cartridge models can be provided reproducing different pathological conditions (such as different stone morphologies and consistencies, etc.). It is also proposed to fill the kidney with urine-simulating liquid to make the training procedure more realistic.

All the materials used to construct the mannequin are compacted (including the joints between the different materials) and do not present previously predisposed holes.

To construct the mannequin a mould 50 was created made with polymethylmethacrylate (PMMA). The description refers to a mannequin 30 as shown in FIG. 3.

The mould 50 comprises a base 51 (thickness 10 mm), two lateral walls (thickness 5 mm), 52 (longer) and 53 (shorter), of a thickness such as to give rigidity to the mould 50.

In the baser and in the walls, slots are provided in which removable panels (thickness 1 mm) are positioned to define the various parts.

A panel 55, the most external, joins the lateral walls 52 and 53 together.

An intermediate panel 56, internal to and equidistant from the panel 55, also joins the lateral walls 52 and 53 together.

An internal panel 57 which initially (starting from the wall 52) extends equidistant from the preceding panels 55 and 56, then comprises a re-entrant part (the distance between the panels 56 and 57 increases) before reaching the wall 53.

Internal to the panel 57, in proximity to the curvature of the base 51 (and of the relative panels) a cylindrical spacer 58 is positioned to identify the space for the kidney capsule. A cylinder 59, preferably made of PMMA, is also inserted to simulate the vertebral column, in proximity to the wall 53, to identify the space for the vertebral column. The space between the panels 55 and 56 identifies the mould for the subcutaneous fat, the space between the panels 56 and 57 identifies the mould for the muscle, and the space internal to the panel 57 identifies the mould for the liver.

The procedure for preparing the solutions consists of mixing the PVA powder with distilled water in the indicated proportions. The mixture is then placed, in a closed container, in an oven for six hours and is then cooled to ambient temperature to achieve adequate degassing. The resultant compound is poured into the mould and subjected to at least one cycle of freezing to −30° C. for 14 hours and then thawed out to obtain the required physical properties.

A possible working sequence can be as follows:
Insert the cylinder 59 which identifies the vertebral column.
Pour the mixture into the space between the panels 56 and 57 to obtain the muscle.
Freezing cycle.
Remove the panel 57.
Insert the cylindrical spacer 58 which identifies the space for the kidney capsule.
Pour the mixture into the space in the interior of the muscle to obtain the liver.
Freezing cycle.
Remove the panel 56.
Pour the mixture into the space between the panel 55 and the muscle to obtain the subcutaneous fat.
Freezing cycle.
Remove the panel 55, the walls 52 and 53, and the base 51.
Remove the spacer for the kidney cartridge.
Insert the kidney cartridge.

The kidney cartridge consists of a fresh or a formalin-treated kidney, with or without pathological conditions simulated therein (stones), filled or not filled with liquid, immersed in a matrix of food grade gelatine which simulates the perirenal fat from the haptic and echographic viewpoint. In this case food grade gelatin was chosen because the values of its parameters correspond to those sought for its ease of preparation and its low cost. This part of the mannequin, containing the kidney, is perishable by virtue of its nature, hence once used it is eliminated together with the gelatin layer, whereas the other part of the mannequin can be reused several times as the material used is not perishable.

To prepare gelatin sold in sheets: the sheets are left to soak for 10 minutes at ambient temperature, the excess water is eliminated and the sheets are dissolved by heating them over a light flame. A water quantity is added in relation to the gelatin concentration to be obtained, for example 40%, i.e. 15 ml of water for every 6 grams of gelatin.

The gelatin is poured into a mould of the form of the cylindrical spacer 58, where a kidney is placed in a suitable position. Cooling is applied until the gelatin has hardened. The cartridge is extracted from the mould and is inserted into the space defined by the cylindrical spacer 58, possibly with the aid of an ultrasound gel layer to facilitate elimination of air between the contacting surfaces.

The mannequin is now ready for use.

According to the present invention, the materials used best approach the values of the human body, and in particular have characteristics as shown in Table 2, which reflect with small variations the values of Table 1. In particular, the values are: sound propagation velocity c between 1500 and 1550 [m/s], acoustic impedance Z between 1.5 and 1.7 [$10^6$ Kg/sm$^2$], and attenuation coefficient A between 0.02 and 0.1 [dB/cm MHz]. The attenuation coefficient is that which is most distant from optimal values, but is also that which influences less the echographic response, it hence being considered secondary. In contrast, the parameters which most influence the echographic response, i.e. the sound propagation velocity and the acoustic impedance Z have values much closer to those required.

To obtain a mannequin suitable for surgical training, the materials used were chosen such that they can be penetrated by surgical instruments, and in particular such that they can be completely perforated but without tearing, i.e. on inserting a surgical instrument the materials must deform only locally without forming apertures or tears, i.e. they should behave as human tissues and organs.

In this respect, materials were chosen which, in addition to the aforedescribed characteristics, have an elastic modulus similar to that of body tissues, i.e. between 0.4 and 0.8 kPa for the liver, between 1.8 and 3.2 kPa for the muscle, and between 2.2 and 4.2 kPa for the fat. Hence summarizing, the materials have elastic moduli between 0.4 and 4.2 kPa.

These materials are able to be perforated manually (hence by forces similar to those exerted by a surgeon in ordinary operations) and totally, by the needles normally used in surgery for these purposes, for example having a diameter between 0.7 and 1.7 mm. Normally the surgeon then inserts a dilator which enlarges the hole up to about 8 mm, and inserts a guide of this diameter through which the procedure is performed.

The mannequin according to the present invention represents considerable improvements compared with those available commercially, in fact it incorporates all the characteristics for the training of the entire surgical procedure under examination. In particular, there is an adequate anthropomorphic representation of the back portion, a considerable representation of the kidney stones, correct modeling of the internal structures interposed between the back and kidneys, the facility to use the echographic probe, the facility to choose the point in which to perform the nephrostomy (i.e. absence of predetermined paths), the facility to perforate the materials even with large calibre instruments, and the facility to partially reuse the structure.

The kidney capsule is replaced nearly at each intervention, whereas the other structure can be reused many times and, moreover, the apertures which are made within the mannequin partially close on withdrawing the surgical instrument and leave an echo on the echograph, as in the case of human patients.

TABLE 1

|  | r [Kg/m$^3$] | c [m/s] | Z [10$^6$ Kg/sm$^2$] | A [dB/cm MHz] |
|---|---|---|---|---|
| Fat | 950 | 1450 | 1.37 | 0.65 |
| Kidney | 1040 | 1557 | 1.62 | 1 |
| Muscle | 1070 | 1585 | 1.65-1.74 | 1.12 |
| Liver | 1060 | 1547-1585 | 1.64-1.67 | 0.7 |
| Bone | 1380-1810 | 2700-4100 | 3.75-7.4 | 20 |

TABLE 2

|  |  | c [m/s] | Z [10$^6$ Kg/sm$^2$] | A [dB/cm MHz] |
|---|---|---|---|---|
| Subcutaneous fat | 5% PVA and water | 1505 | 1.52 | 0.02 |
| Perirenal fat | Gelatin and 15% water | 1510 | 1.57 | 0.04 |
| Muscle | 12% PVA and water | 1537 | 1.65 | 0.096 |
| Liver | 8% PVA and water | 1519 | 1.57 | 0.086 |

The invention claimed is:

1. A device for surgical training comprising:
   an external first layer (11, 45) which simulates the subcutaneous fat;
   a second layer (12, 44) internal to said first layer (11, 45), which simulates the muscle;
   a third layer (18, 43) internal to said second layer (12, 44), which simulates the internal organs;
   a fourth layer (16, 17, 42), internal to said third layer (18, 43), which simulates the perirenal fat;
   a kidney (14, 15, 41), internal to said fourth layer (16, 17, 42);
   a fifth layer (13) internal to said second layer (12) representing the vertical column;
   said first layer (11, 45), second layer (12, 44) and third layer (18, 43) are formed from a synthetic material;
   said first, second, third and fourth layer having a sound propagation velocity between 1500 and 1550 m/s, an acoustic impedance between 1.5 and 1.7 10$^6$Kg/sm$^2$, an elastic modulus between 0.4 and 4.2 kPa, and said device being able to be perforated manually by surgical instruments; said device is substantially of rectangular shape in section; said fifth layer (13) and said fourth layer (16, 17) are of cylindrical shape.

2. A device as claimed in claim 1, characterised in that said fourth layer (16, 17, 42) comprises food grade gelatin.

3. A device as claimed in claim 1, characterised in that said first layer (11, 45), second layer (12, 44) and third layer (18, 43) are formed from synthetic material comprising polyvinyl alcohol.

4. A device as claimed in claim 1, characterised in that said first layer (11, 45), second layer (12, 44) and third layer (18, 43) comprise a mixture formed from polyvinyl alcohol and water, with concentrations from 5 wt % to 12 wt % on the total weight.

5. A device as claimed in claim 1, characterised in that said first layer (11, 45) comprises a mixture formed from polyvinyl alcohol and water, with the concentration of said polyvinyl alcohol equal to 5 wt %.

6. A device as claimed in claim 1, characterised in that said second layer (12, 44) comprises a mixture formed from polyvinyl alcohol and water, with the concentration of said polyvinyl alcohol equal to 12 wt %.

7. A device as claimed in claim 1, characterised in that said third layer (18, 43) comprises a mixture formed from polyvinyl alcohol and water, with the concentration of said polyvinyl alcohol equal to 8 wt %.

8. A device as claimed in claim 1, characterised in that said fifth layer having a sound propagation velocity between 2700 and 4100 m/s, and an acoustic impedance between 3.75 and 7.4 10$^6$Kg/sm$^2$.

9. A device as claimed in claim 1, characterised in that said kidney is a porcine kidney.

10. A device as claimed in claim 1, characterised in that said first, second, third and fourth layer are able to be perforated manually by a needle having a diameter between 0.7 and 1.7 mm.

* * * * *